United States Patent [19]

Ohta et al.

[11] Patent Number: 4,610,421

[45] Date of Patent: Sep. 9, 1986

[54] MOUNTING CONSTRUCTION FOR ENGINE-TRANSMISSION ASSEMBLY

[75] Inventors: Yoshio Ohta; Tadashi Kimura; Kiyoteru Ijichi; Masaaki Takizawa, all of Toyota, Japan

[73] Assignee: Toyota Jidosha Kabushiki Kaisha, Toyota, Japan

[21] Appl. No.: 540,562

[22] Filed: Oct. 11, 1983

[30] Foreign Application Priority Data

Feb. 4, 1983 [JP] Japan ................................ 58-017832

[51] Int. Cl.[4] ............................................. F16M 13/00
[52] U.S. Cl. ...................................... 248/550; 180/297; 248/566; 248/659
[58] Field of Search ................ 248/659, 550, 636, 566; 180/297, 292

[56] References Cited

U.S. PATENT DOCUMENTS

| 726,414 | 4/1903 | Edwards . | |
|---|---|---|---|
| 1,112,066 | 9/1914 | Hollis . | |
| 1,946,319 | 2/1934 | Hodgson et al. . | |
| 1,949,803 | 3/1934 | Loebs . | |
| 2,421,585 | 6/1947 | Thiry . | |
| 3,361,216 | 1/1968 | Walker . | |
| 4,159,091 | 6/1979 | LeSalver et al. . | |
| 4,356,898 | 11/1982 | Guzder et al. . | |
| 4,428,569 | 1/1984 | Takei | 248/636 X |
| 4,449,603 | 5/1984 | Langwieder | 180/297 X |
| 4,516,545 | 5/1985 | Kumagai et al. | 248/636 X |

FOREIGN PATENT DOCUMENTS

| 872160 | 3/1953 | Fed. Rep. of Germany | 180/292 |
|---|---|---|---|
| 183609 | 3/1955 | Fed. Rep. of Germany . | |
| 1924101 | 11/1970 | Fed. Rep. of Germany | 180/292 |
| 57-76340 | 5/1982 | Japan . | |
| 1434453 | 5/1976 | United Kingdom | 180/292 |
| 2041485 | 9/1980 | United Kingdom . | |
| 2070730 | 9/1981 | United Kingdom . | |

*Primary Examiner*—J. Franklin Foss
*Assistant Examiner*—David L. Talbott
*Attorney, Agent, or Firm*—Oblon, Fisher, Spivak, McClelland & Maier

[57] ABSTRACT

An engine-transmission assembly is supported in an engine room of a vehicle by two elastic support devices supporting it substantially at opposite ends of its rolling axis of inertia and two other elastic support devices supporting it substantially at opposite ends of its pitching axis of inertia. The major part of the weight of the engine-transmission assembly may be borne by the two elastic support devices on the rolling axis of inertia, which may be simple rubber block type support devices; and the two elastic support devices on the pitching axis of inertia may be of a type able to present variable spring constant and/or damping coefficient, optionally according to the driving conditions of the vehicle.

3 Claims, 4 Drawing Figures

MOUNTING CONSTRUCTION FOR ENGINE-TRANSMISSION ASSEMBLY

BACKGROUND OF THE INVENTION

1. Field of the Invention

The present invention relates to a mounting structure for an assembly of an engine and a transmission in a vehicle, and in particular to such a mounting structure which is well adapted for mounting an internal combustion engine and a transmission laterally to the vehicle body and for limiting the occurrence of undesirable vibration.

2. Discussion of the Background

In a vehicle such as an automobile, the coupled combination of the engine and the transmission is mounted in the engine room of the vehicle by being suspended therein upon mounting devices which can incorporate both spring means and damping means, such as for example rubber engine mounting blocks, in order to better control engine and body vibration. However, because at various different times the engine is prone to various different vibrations of various different frequencies and amplitudes, prior art mounting systems have not always been found satisfactory, because such mounting systems of a particular spring constant and a particular damping coefficient which were able to control to some extent some sort of vibration of the engine were not able to control other sorts of vibration of the engine. Further, the difficulty has arisen that vibration of the engine-transmission assembly in one vibrational mode has tended to excite vibration in another vibrational mode; for example, rolling vibration of the assembly has sometimes tended to excite vibration in the vertical direction. This is termed coupling of vibrational modes.

In detail, the engine-transmission assembly in a vehicle is liable to undergo five main different types of vibration, hereinafter termed idling vibration, stumbling, engine shaking, engine wind up vibration, and booming.

The idling vibration of an engine-transmission assembly is a phenomenon that the engine-transmission assembly rolls vibrationally about the one axis of its principal axes of inertia which typically is nearly parallel to and nearly coincident with the rotational axis of the power output member of the engine-transmission assembly, during idling operation of the engine (which is one of the minor axes of inertia), and this occurs when the resonant frequency of rotation of the engine-transmission assembly around this principal axis of inertia coincides with or is an exact multiple or submultiple of the rotational speed of the engine. This idling vibration is a particular problem in a vehicle in which the engine-transmission assembly is transversely mounted, because the vibration is particularly effectively transmitted to the vehicle body in such a case. In order to suppress this idling vibration of the engine-transmission assembly, the spring constant and the damping coefficient of the engine supports that are particularly concerned with this vibration are both required to be low, so as to lower the resonant frequency of rotation of the engine-transmission assembly around this principal axis of inertia, and so as not to present a high apparent spring constant as explained below. The amplitude of this idling vibration tends to be quite low, while the frequency is medium to quite high.

Stumbling is a phenomenon wherein the vehicle is vibrationally jerked in the fore and aft directions during rapid acceleration or deceleration of the vehicle, and this is due to twisting or rolling vibration of the engine-transmission assembly caused by rapid changes of torque supported by the engine-transmission assembly housing relative to the output shaft of the engine. In order to suppress this stumbling, the spring constant and the damping coefficient of the relevant parts of the engine-transmission assembly mounting system are both required to be high. The amplitude of this stumbling tends to be quite high, while the frequency is quite low.

Engine wind up vibration is a phenomenon wherein the engine-transmission assembly vibrates up and down relative to the vehicle body by being coupled to the rolling vibration of the engine-transmission assembly, when the vehicle is suddenly accelerated or decelerated; and this occurs when the natural frequency of the relevant parts of the engine-transmission assembly mounting system in the vertical direction resonates with the frequency of such rolling vibration of the engine-transmission assembly. In order to suppress this engine wind-up vibration, it is required to uncouple the vertical vibration of the engine-transmission assembly from the rolling vibration thereof.

Engine shaking is a phenomenon wherein the engine-transmission assembly vibrates up and down relative to the vehicle body during operation of the vehicle upon an irregular road surface, due to the bumping of the vehicle body up and down upon the irregular road surface, said bumping of the vehicle body being transmitted to the engine-transmission assembly by way of the mounting system therefor, and this occurs when the natural frequency of the relevant parts of the engine-transmission assembly mounting system in the vertical direction resonates with the up and down vibrational bouncing movement of the vehicle body. In order to suppress this engine shaking, the spring constant and the damping coefficient of the relevant parts of the engine-transmission assembly mounting system are both required to be high. The amplitude of this engine shaking tends to be quite high, while the frequency is quite low.

Finally, the booming is a phenomenon wherein a booming noise is generated, typically during high speed relatively steady operation of the vehicle, in the passenger compartment of the vehicle due to vibrations of relatively high frequency of the engine-transmission assembly and the drive train of the vehicle which are consonant with the natural frequency of the vehicle body, particularly the compartment structure of the vehicle, thus causing a booming noise in the passenger compartment. In order to suppress this booming noise, the spring constant and the damping coefficient of the relevant parts of the engine-transmission assembly mounting system are both required to be low. The frequency of this booming is quite high, being about 100 Hz or so. An additional characteristic of the booming vibration of the engine-transmission assembly and the vehicle body is that the amplitude of vibration is much smaller than those of the other above mentioned types of vibration of the engine-transmission assembly, being in the neighborhood of 15 microns or so in half wave amplitude.

Now, it should be understood that the spring constant of a combination device for coupling two members together, which is made up of a combination of a spring type or resilient mounting device and a damping device, in principle is of course solely due to the springing device, and in principle is quite independent of the damping effect or damping coefficient of the damping device. However, at any particular frequency of applied vibration, there is a so called apparent or effective spring constant, which is a combination of the actual spring constant and a contributory apparent spring constant element due to the operation of the damping device which increases along with increased damping coefficient of the damping device. Thus, when the applied force is a periodic vibration, if the damping device has a lower damping coefficient, it will appear that the spring effect of the combination as a whole is softer; and, contrariwise, if the damping device has a higher damping coefficient, it will appear that the spring effect of the combination as a whole is harder. Further, the higher the increase in the effective spring constant due to the action of the damping device, the higher is the frequency of vibration applied to the combination device; in other words, the higher these values are, the greater is the rate of change of position between the two members which are being coupled together by the combination device. The details of the exact mathematics involved are beyond the scope of the present specification, for which the empiricial discussion above is sufficient.

It is of course desirable that the mounting of the engine-transmission assembly in the vehicle should be accomplished by as simple a means as possible. Also it is important that the arrangement and type of the mounting means should be appropriate for suppressing these various types of vibration explained above. Since the various forms of vibration each have a particular directivity, and since a particular spring constant and a particular damping coefficient are appropriate for controlling each of these forms of vibration, a proper choice of the number and positioning of the mounting devices for the engine-transmission assembly is very important for providing proper vibration control.

SUMMARY OF THE INVENTION

Accordingly, it is the primary object of the present invention to provide a mounting construction for an engine-transmission assembly, which can appropriately support the engine-transmission assembly by appropriate means at appropriate points, so as properly to control and minimize the various forms of vibration to which said engine-transmission assembly is subject.

It is a further object of the present invention to provide such a mounting construction for an engine-transmission assembly, which is well adapted for mounting an engine-transmission assembly transversely in a vehicle.

It is a further object of the present invention to provide such a mounting construction for an engine-transmission assembly, which specifically can cope well with idling vibration, stumbling, engine wind up vibration, engine shaking, and booming.

It is a further object of the present invention to provide such a mounting construction for an engine-transmission assembly, which decouples the various vibrational modes of the engine-transmission assembly.

According to the most general aspect of the present invention, these and other objects are accomplished by a construction for mounting an engine-transmission assembly in a vehicle, comprising: (a) two elastic support devices which elastically support said engine-transmission assembly substantially at opposite ends of its rolling axis of inertia; and (b) two other elastic support devices which elastically support said engine-transmission assembly substantially at opposite ends of its pitching axis of inertia.

According to such a construction, the vertical vibration of the engine-transmission assembly and the rolling vibration thereof are mutually uncoupled, so that a vibration in one of these vibrational modes does not induce a vibration in the other of them. Further, by arranging the two elastic support devices which are to be provided on the two sides of the engine-transmission assembly substantially at opposite ends of the pitching axis of inertia of the engine-transmission assembly, whereby the direction of the motion and compression acting on these two elastic support devices which are caused by these two vibrational modes—the vertical vibration and the rolling vibration of the engine-transmission assembly—are made similar to one another, so that the attenuation of these two vibrations can be accomplished in a similar manner.

Further, according to a more particular aspect of the present invention, these and other objects are more particularly and concretely accomplished by such a construction for mounting an engine-transmission assembly in a vehicle as described above, wherein said two elastic support devices which elastically support said engine-transmission assembly substantially at opposite ends of its rolling axis of inertia support the major proportion of the weight of said engine-transmission assembly; and in this case these two elastic support devices may be simple block type supports.

According to this construction, the main weight of the assembly may be supported by the two rolling axis elastic support devices which can be advantageously thus constructed as being very robust and simple so as to support this weight; while the construction and the operation of the other two elastic support devices at opposite ends of the pitching axis of inertia of the engine-transmission assembly can be more delicate and sophisticated.

Thus, according to a yet more particular aspect of the present invention, these and other objects are yet more particularly and concretely accomplished by such a construction for mounting an engine-transmission assembly in a vehicle as proximately described above, wherein said two elastic support devices which elastically support said engine-transmission assembly substantially at opposite ends of its pitching axis of inertia are of a type able to present variable spring constant and/or damping coefficient.

Since the spring constant (at least apparent) and the damping coefficient of these two elastic support devices which elastically support said engine-transmission assembly substantially at opposite ends of its pitching axis of inertia are desired to be small in order to attenuate the idling vibration (which is a rolling vibration) and the vibration which induces booming (which is a vertical vibration) on the one hand, and are desired to be great in order to attenuate the stumbling vibration (which is a rolling vibration) and the engine shaking (which is a vertical vibration) on the other hand, it is desired that these two elastic support devices should be of such an active control type which is able to alter its spring constant and its damping coefficient.

Futher, according to a yet more particular aspect of the present invention, these and other objects are yet more particularly and concretely accomplished by such a construction for mounting an engine-transmission assembly in a vehicle as described above, wherein said two elastic support devices which elastically support said engine-transmission assembly substantially at opposite ends of its pitching axis of inertia are of a type which presents variable spring constant and/or damping coefficient according to the amplitude of the applied vibration.

According to such a construction, since on the one hand the magnitude of the vibration which induces booming (which is a vertical vibration) is very small, and this booming vibration requires the spring constant and the damping coefficient of these two elastic support devices which elastically support said engine-transmission assembly substantially at opposite ends of its pitching axis of inertia to be small for good attentuation, while on the other hand this spring constant and this damping coefficient are desired to be great in order to attenuate the stumbling vibration (which is a rolling vibration) and the engine shaking (which is a vertical vibration) which by contrast have a relatively large amplitude of vibration, it is appropriate that these two elastic support devices should be of a type which presents variable spring constant and/or damping coefficient according to the amplitude of applied vibration.

BRIEF DESCRIPTION OF THE DRAWINGS

The present invention will now be shown and described with reference to the preferred embodiment thereof, and with reference to the illustrative drawings. It should be clearly understood, however, that the description of the embodiment, and the drawings, are all given purely for the purposes of explanation and exemplification only, and none of them are intended to be limitative of the scope of the present invention. In the drawings, like parts and features are denoted by like reference symbols in the various figures thereof, and.

DESCRIPTION OF THE PREFERRED EMBODIMENT

Figure 1:
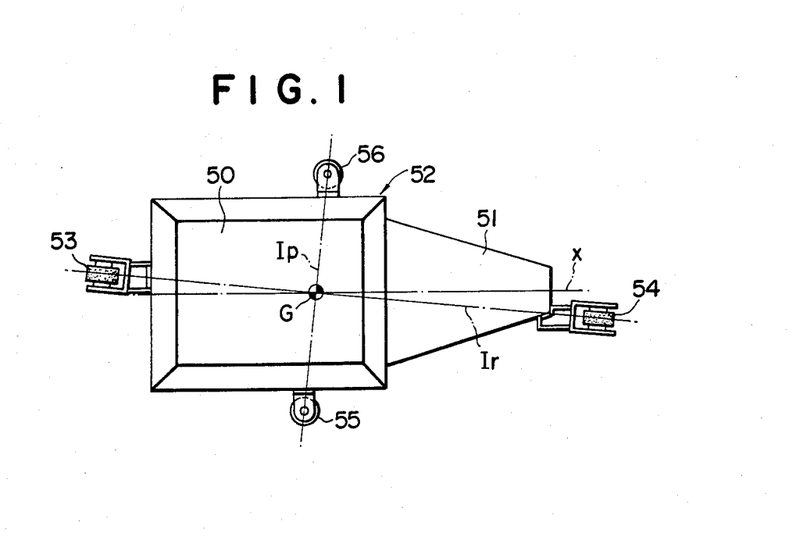
FIG. 1 is a schematic plan view of an engine-transmission assembly of a vehicle and of the preferred embodiment of the mounting construction for an engine-transmission assembly of the present invention which supports said engine-transmission assembly in the engine room (not shown) of a vehicle (also not shown)
Figure 2:
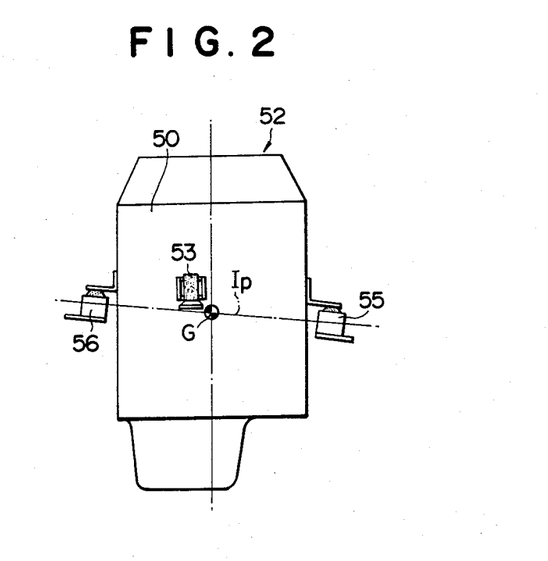
FIG. 2 is a side view of the engine transmission assembly and of the mounting construction according to the present invention therefor shown in FIG. 1.

The present invention will now be described with reference to the preferred embodiment thereof, and with reference to the appended drawings. Referring first to FIGS. 1 and 2, reference numerals 50 and 51 respectively denote an engine and a transmission, which are securely coupled together so as to be fixed together as one unit denoted by reference numeral 52. This engine-transmission unit 52 is mounted within an engine room (not shown) of a vehicle (also not shown) by a mounting construction which is the preferred embodiment of the present invention and which will now be described; in fact, the engine-transmission assembly 52 is thus mounted transversely to the longitudinal axis of the vehicle, although this is not shown in the figures.

The engine-transmission assembly 52 has, of course, three perpendicular principal axes of inertia; and one of these, denoted by Ir in FIG. 1 and hereinafter referred to as the rolling axis of inertia of the engine-transmission assembly 52, in fact is nearly coincident with the line "x" which is the rotational axis of the power output member of the engine 50 and also of the power input and power output members of the transmission 51. Further, another of these principal axes of inertia of the engine-transmission assembly 52, denoted by Ip in FIG. 1 and hereinafter referred to as the pitching axis of inertia of the engine-transmission assembly 52, extends substantially horizontally and nearly along the longitudinal direction of the body (not shown) of the vehicle (also not shown), according to the aforesaid transverse mounting of the engine-transmission assembly 52 in the vehicle. Of course, both this rolling axis of inertia Ir and this pitching axis of inertia Ip pass through the center of gravity G of the engine-transmission assembly 52.

Particularly according to the inventive concept of the present invention, the engine-transmission assembly 52 is elastically supported at opposite ends of its rolling axis of inertia Ir by two elastic support devices 53 and 54, and at opposite ends of its pitching axis of inertia Ip by two other elastic support devices 55 and 56. Thus, very approximately, the two elastic support devices 53 and 54 are located at opposite axial ends of the engine-transmission assembly 52, and the two other elastic support devices 55 and 56 are located on opposite sides of the engine-transmission assembly 52.

In the illustrated preferred embodiment of the present invention, furthermore, the two elastic support devices 53 and 54 which support the engine-transmission assembly 52 at opposite ends of its rolling axis of inertia Ir are those which mainly support the weight of the engine-transmission assembly 52, and the two elastic support devices 55 and 56 which support the engine-transmission assembly 52 at opposite ends of its pitching axis of inertia Ip do not support a very large proportion of the weight of said engine-transmission assembly 52. Further, these two elastic support devices 53 and 54 which support the engine-transmission assembly 52 at opposite ends of its rolling axis of inertia Ir are in this illustrated preferred embodiment per se well known bush or block type elastic support devices consisting essentially of rubber blocks opposite parts thereof being bonded to support brackets, while on the other hand the two elastic support devices 55 and 56 which support the engine-transmission assembly 52 at opposite ends of its pitching axis of inertia Ip are substantially identical vertically mounted so called active control type elastic support devices which have a particular behaviour with respect to variation of spring constant and damping coefficient, and are of a sort which has been invented by some of the present inventors of the present application and for the inventive concept of which U.S. patent application Ser. No. 540,560 has been filed, copending with the present application. The particular construction of these active control type elastic support devices 55 and 56 will now be explained, with particular reference to FIGS. 3 and 4, along with the reasons why they are so suitable for application to the present invention.

Figure 3:
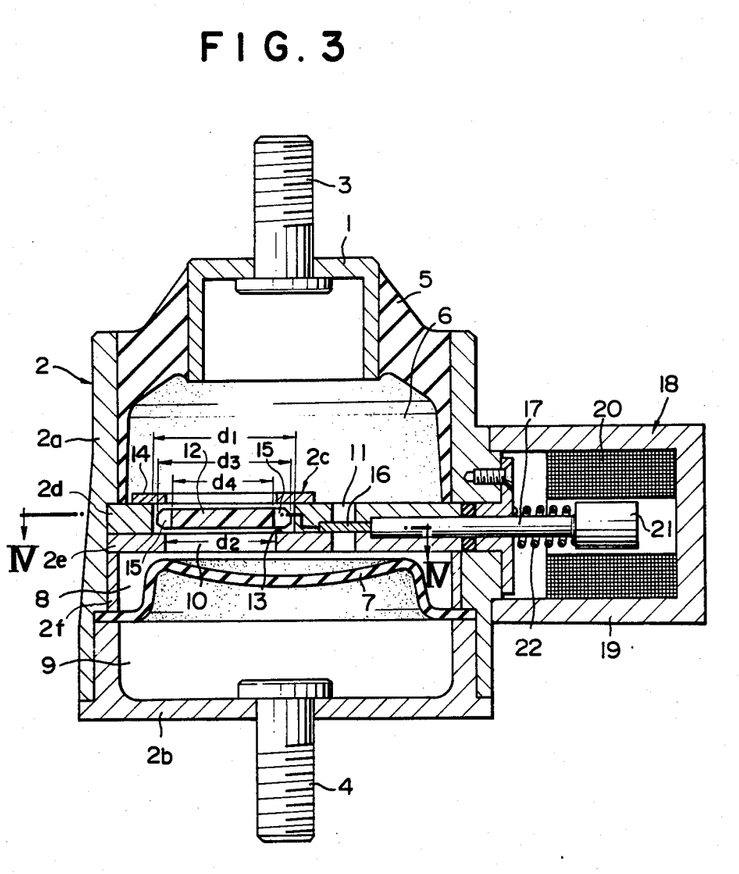
FIG. 3 is a sectional view of an anti-vibration mounting device used in said preferred embodiment of the mounting construction for an engine-transmission assembly of the present invention shown in FIGS. 1 and 2, taken in a plane including the central axis of a tubular outer member thereof.

In FIG. 3, the reference numeral 1 denotes a body member 1 typical of these elastic support devices 55 and 56, and this body member 1 is shaped like a cup member with its opening facing downwards in the figure and is provided with a bolt 3 fixed in the center thereof and projecting upwards, thus being adapted to be secured to either the engine-transmission assembly 52 or the vehicle body. Further, another body member 2 is of the support device is also shaped like a cup member, with its opening facing upwards in the figure, but larger than the body member 1, and is provided with another bolt 4 fixed in the center of the end cap thereof and projecting downwards, thus similarly being adapted to be secured to the other one of the engine-transmission assembly 52 or the vehicle body. In fact, the body member 2 is made up of: a tubular member 2a which forms its cylindrical outer portion; an end cap member 2b which closes one end of the tubular member 2a and in the center of which the aforesaid bolt 4 is fixed; and a partition 2c, in fact made up of two partition plates 2d and 2e which lie against one another, which extends across the tubular member 2a at an intermediate position along and perpendicular to the central axis thereof. The body member 1 is disposed generally coaxially with the body member 2 in the open end of the tubular member 2a, and the inner cylindrical surface of an annular resilient element 5 made of a rubber material or some similar elastomer (per se well known) is fluid tightly secured to the outer peripheral cylindrical surface of the body member 1, while the outer cylindrical surface of the resilient element 5 is fluid tightly secured to the inner peripheral cylindrical surface of the tubular member 2a near its open end. Thus, in a per se well known manner, the annular resilient element 5 provides a function of a spring mounting between the body members 1 and 2, according to the resilience which it provides between its inner and outer peripheral cylindrical surfaces with respect to movement in the axial direction therebetween, and also possibly by the elasticity of fluid charged in the chamber 6 as will be explained later, with a spring constant which is determined by the dimensions and the material of said resilient element 5 and possibly by the nature of such fluid, and in general is quite large since the resilient element 5 is substantially extended in the axial direction. The resilient element 5, in cooperation with the body member 1, thus closes the upper end in the figure of the tubular member 2a in a fluid tight fashion.

Above the partition 2c in the figure, by said partition 2c, the tubular member 2a, the body member 1, and the resilient element 5, there is thus defined a first chamber 6, referred to as the pressure chamber hereinafter, access to which from the outside thereof is only available through two apertures 10 and 11 in the partition 2c as will hereinafter be explained; and below the partition 2c in the figure, by it, the tubular member 2a, and the end cap member 2b, there is also defined another chamber, which is divided from the point of view of the figure into an upper chamber 8 and a lower chamber 9 by a flexible diaphragm 7 made of a rubber material or some similar flexible elastomer per se well known, the outer periphery of which is secured around an axially intermediate part of the inner cylindrical surface of the tubular member 2a by being clamped between the inner side of the end cap member 2b and the lower end of a packing ring 2f the upper end of which bears against the lower and outer side of the lower partition plate 2e. This diaphragm 7 is so flexible as to have substantially no resistance to deformation, in comparison to the resilient element 5. Access to the upper chamber 8 from the outside thereof is only available from the chamber 6 through the aforesaid two apertures 10 and 11 in the partition 2c as will hereinafter be explained; whereas access to the lower chamber 9 from the atmosphere outside the anti vibration mounting device is substantially freely available, although this is not so shown in the figure. Accordingly, the pressure within the lower chamber 9 is always exactly equal to atmospheric pressure, and thus the pressure within the upper chamber 8 is always substantially equal to atmospheric pressure, because the diaphragm 7 is very flexible.

Through the partition 2c (i.e. through both the plates 2d and 2e thereof in substantially corresponding places thereon) there are formed two apertures: a generally circular aperture 10, and a generally crescent shaped aperture 11. Thus each of these two apertures 10 and 11 communicates the chamber 6 to the chamber 8, and they are provided in parallel. These apertures 10 and 11 have relatively large cross sectional areas. The chambers 6 and 8, and the apertures 10 and 11, are filled with a fluid having an appropriate viscosity for the purpose, such as a per se well known shock absorber fluid; this is not specifically indicated in FIG. 3 in order not to complicate the drawing.

The arrangements for throttling the apertures 10 and 11 will now be described.

Figure 4:
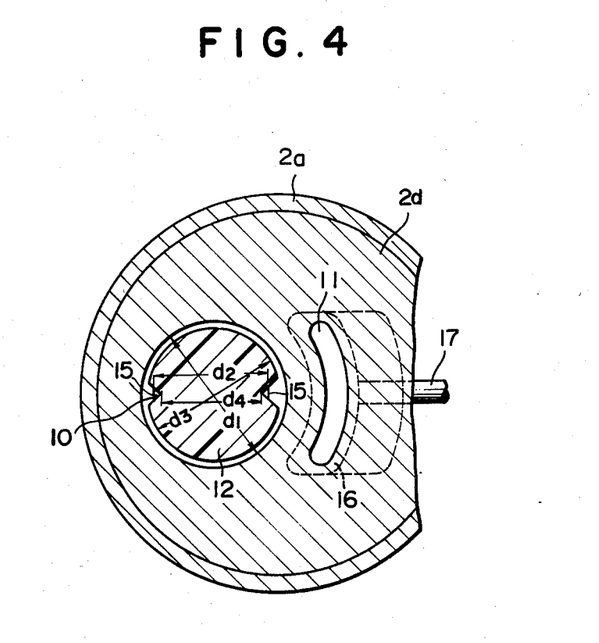
FIG. 4 is a staggered sectional view of a partition assembly and associated elements of said anti vibration mounting device, taken along the staggered plane indicated by the arrows IV—IV in FIG. 3.

First, with regard to the crescent shaped aperture 11, which can be more clearly seen in FIG. 4, in a gap defined between indented shapes in the upper and lower partition plates 2d and 2e located at an intermediate part of the aperture 11 there is slidingly fitted a thick slide valve element 16 of a crescent form. Thus, when this slide valve element 16 is slid to the left in the figures, it closes the aperture 11 and prevents communication between the pressure chamber 6 and the chamber 8 therethrough; but, when the slide valve element 16 is slid to the right in the figures, it opens the aperture 11 and allows communication between the pressure chamber 6 and the chamber 8 therethrough. This valve element 16 is connected to the end of an actuator rod 17 of a solenoid actuator 18. This solenoid actuator 18 comprises a case 19 securely fixed to one side of the outside of the tubular member 2a, a coil 20 mounted within the case 19, a solenoid core 21 which is coupled to the other end of said actuator rod 17 and which is located within the central hole of said coil 20, and a compression coil spring 22 mounted between the outer surface of the tubular member 2a and the solenoid core 21 which biases the solenoid core 21, the actuator rod 17, and the slide valve element 16 to the right in the figures.

Thus, when the coil 20 is supplied with actuating electrical energy, it attracts the solenoid core 21 to the left in the figures, thus pushing the actuator rod 17 and the slide valve element 16 to the left against the biasing action of the compression coil spring 22 which is overcome and thus interrupting communication between the pressure chamber 6 and the chamber 8 through the aperture 11. On the other hand, when the coil 20 is not supplied with actuating electrical energy, by the biasing action of the compression coil spring 22 the solenoid core 21 and the actuator rod 17 and the slide valve element 16 are moved to the right in the figures, thus allowing communication between the pressure chamber 6 and the chamber 8 through the aperture 11. The coil 20 of the solenoid actuator 18 is selectively applied with actuating electrical energy by a control system which is not shown in the figures and which will not be described particularly herein, since it could be realized in any of a number of different ways some of which are per se well known, and since in any case it is not part of the present invention. Thus, this actuating electrical energy supplying control system will not be described with regard to its structure but, hereinafter, only with regard to its function.

Next, with regard to the circular shaped aperture 10, as can be best seen in FIG. 3 the part of this aperture 10 defined by the upper partition plate 2d has a somewhat larger diameter, represented by $d_1$, than the part of said aperture 10 defined by the lower partition plate 2e, which has a diameter represented by $d_2$. Thus an annular shoulder 13 is formed on the inner defining surface of the aperture 10 between the upper and lower partition plates 2d and 2e. A generally disk shaped throttle plate 12 which is thinner in the axial direction (i.e. the up and down direction of FIG. 3) than the upper partition plate 2d is provided as freely lying within said part of said aperture 10 defined by the upper partition plate 2d. The diameter of the throttle plate 12, represented in FIG. 4 by $d_3$, is less than the diameter $d_1$ of the hole in said upper partition plate 2d, but is larger than the diameter $d_2$ of the hole in said lower partition plate 2e. The throttle plate 12 is retained within the hole in the upper partition plate 2d by an annular cover plate 14, the central hole in which is also of diameter substantially equal to $d_2$, and which is fixed to the upper surface of FIG. 3 of the upper partition plate 2d by means not shown in the figures. Thus, the throttle plate 12 can move upwards and downwards within the hole in the upper partition plate 2d through a certain distance range equal to the difference between the thickness of the upper partition plate 2d and the thickness of the throttle plate 12, but cannot escape either upwards or downwards from said hole in said upper partition plate 2d. Further, a plurality of vent notches 15 (two in the shown construction) are formed in the outer periphery of the throttle plate 12, as best seen in FIG. 4. The distance between the inner parts of opposing ones of these vent notches 15, represented by $d_4$ in FIG. 4, is less than the diameter $d_2$ of the holes in the lower partition plate 2e and in the annular cover plate 14. And the specific gravity of the material from which the throttle plate 12 is constructed is substantially the same as that of the aforesaid fluid with which the chambers 6 and 8 and the apertures 10 and 11 are filled, so that said throttle plate 12 has no substantial tendency either to float or to sink in said fluid.

By this construction, when the throttle plate 12 is not pressed either upwards against the annular cover plate 14 or downwards against the shoulder 13 of the lower partition plate 2e, then the pressure chamber 6 and the chamber 8 are communicated with one another via the aperture 10 around the sides of said throttle plate 12, accordingly with a relatively low flow resistance therebetween; but on the other hand when the throttle plate 12 is pressed either upwards against the annular cover plate 14 or downwards against the shoulder 13 of the lower partition plate 2e, then the pressure chamber 6 and the chamber 8 are communicated with one another via the aperture 10 only through one or more of the relatively restricted vent notches 15 formed in the edge of said throttle plate 12 (which is possible because the distance $d_4$ is less than the distance $d_2$), accordingly with a relatively high flow resistance therebetween.

This anti-vibration mounting device operates as follows.

When no actuating electrical energy is supplied by the aforesaid control system to the coil 20 of the solenoid actuator 18, then as explained above the crescent shaped aperture 11 is opened, and in this state, irrespective of the state of the circular aperture 10 and the throttle plate 12 etc., the pressure chamber 6 and the chamber 8 are communicated to one another via the aperture 11 with a relatively low flow resistance therebetween, irrespective of the amount of relative movement between the body member 1 and the body member 2, i.e. of the amplitude of applied vibrations. Therefore the damping coefficient provided by the device as a whole between the two members to which the bolts 3 and 4 are secured and which it mounts to one another is relatively low, and accordingly the apparent spring constant of the device is relatively low.

On the other hand, when actuating electrical energy is supplied by the aforesaid control system to the coil 20, then as explained above the crescent shaped aperture 11 is closed, and in this state the only possibility for communication between the pressure chamber 6 and the chamber 8 is through the circular aperture 10. Now, as the engine-transmission assembly 52 and the body of the vehicle, to which the bolts 3 and 4 are respectively secured and which it mounts to one another, move with respect to one another in the vertical direction as viewed in the figure, thus moving the body members 1 and 2 relative to one another in the vertical direction by flexing the resilient member 5, this forces the fluid in the chambers 6 and 8 out from one of these chambers into the other through this circular aperture 10. As this occurs, if the amplitude of the relative movement between the body members 1 and 2 is relatively large, for the first part of such relative movement between the body members 1 and 2, the throttle plate 12 will not yet have been swept by the current of flowing fluid so far in the upwards or the downwards direction in the figure as to be pressed either against the lower partition plate 2e or against the annular cover plate 14, and thus the flow of fluid between the chambers 6 and 8 will occur via the aperture 10 around the sides of said throttle plate 12, accordingly with a relatively low flow resistance being provided to this flow. On the other hand, after this first (relatively small) part of the relative movement between the body members 1 and 2, the throttle plate 12 is swept by the flow of fluid thus caused through the aperture 10 so far in the upwards or the downwards direction in the figure as to be pressed either against the lower partition plate 2e or against the annular cover plate 14, against which it is thereafter securely held by the difference between the pressures in the chamber 6 and the chamber 8, and thereafter the flow of fluid between the chambers 6 and 8 can only occur via the aperture 10 through one or more of the relatively restricted vent notches 15 formed in the edge of said throttle plate 12, accordingly with a relatively high flow resistance being provided to this flow. On the other hand, if the amplitude of the relative movement between the body members 1 and 2 is relatively small, then during the entire range of relative movement between the body members 1 and 2 the throttle plate 12 will not be swept by the current of flowing fluid so far in the upwards or the downwards direction in the figure as to be pressed either against the lower partition plate 2e or against the annular cover plate 14, and thus the flow of fluid between the chambers 6 and 8 will always occur via the aperture 10 around the sides of said throttle plate 12, with a relatively low flow resistance being provided to this flow. Therefore, as a whole, in this operational mode with actuating electrical energy being supplied by the control system to the coil 20 of the solenoid actuator 18, the characteristics of the mounting action provided by the device as a whole between the two members to which the bolts 3 and 4 are secured and which it mounts to one another are that: if the amplitude of the vibration is relatively low, then the damping constant is relatively low, and accordingly the apparent spring constant of the device is relatively low; while, if the distance of motion or the amplitude of the vibration is greater than a certain amount, then the damping constant becomes relatively high, and accordingly the apparent spring constant of the device becomes relatively high. Further, when the damping coefficient is high, a further effect may occur that the annular resilient element 5 may present a genuinely higher spring constant, due to compression thereof between a high pressure present (perhaps sporadically) in the pressure chamber 6 and the outside.

Now, the particular anti-vibration advantages of the use of this anti-vibration mounting device for application to the present invention of a mounting construction for supporting an engine-transmission unit in a vehicle will be described. In this use, it is envisaged by the present inventors as being appropriate that actuating electrical energy should be supplied by the aforesaid control system to the coil 20 of the solenoid actuator 18, when and only when the engine 50 of the vehicle is being operated not in the idling condition.

First, therefore, during this idling operation in which the coil 20 is not being supplied with actuating electrical energy and in which the aperture 11 is accordingly opened as explained above, at this time the pressure chamber 6 and the chamber 8 are communicated to one another via the aperture 11 with a relatively low flow resistance therebetween, irrespective of the amplitude of applied vibrations, and the damping coefficient provided by the device as a whole between the engine-transmission assembly 52 and the body of the vehicle is relatively low, and the apparent spring constant of the device is relatively low. This is as previously explained appropriate in order to control idling vibration. This action will be independent of the amplitude of the idling vibration, which is appropriate; in fact this amplitude is about 2 mm in half wave amplitude.

On the other hand, in non idling engine operation in which the coil 20 is supplied with actuating electrical energy and in which the aperture 11 is accordingly closed, at this time the chambers 6 and 8 are only communicated to one another via the aperture 10, which takes place around the sides of the throttle plate 12 with a relatively low flow resistance therebetween when the amplitude of applied vibrations is small, but can only take place through the vent notches 15 in the periphery of the throttle plate 12 with a relatively high flow resistance therebetween when the amplitude of applied vibrations is high. (Strictly speaking, this is not the case in the central part of each vibration cycle, i.e. the nodes of the vibrations, but is—depending however upon the amplitude of the applied vibrations—the case only at the peak and trough portions of the vibration cycles, which however form the greater part of such vibration cycles as far as damping coefficient and apparent spring constant is concerned).

Now, as stumbling and also engine shaking only tend to occur during non idling engine operation, and as these forms of vibration have a relatively high amplitude, if these vibrations should occur, the damping coefficient presented by the anti vibration mounting device of FIGS. 3 and 4 will be quite high, due to the high amplitude of this vibration, as described above. Accordingly the apparent spring constant will also be quite high; and as explained above the actual spring constant may also be increased due to the compression of the resilient memeber 5; as explained earlier, this is appropriate in order to control the so called stumbling and engine shaking type vibrations.

On the other hand, as booming, which similarly only occurs during non idling engine operation, has a relatively low amplitude, of in fact some 15 microns or so in half wave amplitude, while having a high frequency of about 100 Hz or so, if this vibration should occur, the damping coefficient presented by the anti-vibration mounting device will be quite low, due to the low amplitude of this booming vibration, as described above. Accordingly the apparent spring constant will also be quite low. As explained earlier, this is appropriate in order to control the so called booming type vibration and in order to eliminate it as much as possible.

Thus, it will be seen that the anti-vibration mounting device is particularly suitable for application to the present invention for mounting an engine-transmission assembly in a vehicle, for suppressing various troublesome vibrations such as idling vibration, stumbling, engine wind up vibration, engine shaking, and booming, with a simple switching over of electrical energy according to whether the vehicle is idling or operating in a non idling condition.

Although the present invention has been shown and described with reference to the preferred embodiment thereof, and in terms of the illustrative drawings, it should not be considered as limited thereby. Various possible modifications, omissions, and alterations could be conceived of by one skilled in the art to the form and the content of any particular embodiment, without departing from the scope of the present invention. Therefore it is desired that the scope of the present invention, and of the protection sought to be granted by Letters Patent, should be defined not by any of the perhaps purely fortuitous details of the shown embodiment, or of the drawings, but solely by the scope of the appended claims, which follow.

What is claimed is:

1. A mounting structure for mounting an engine-transmission assembly (52) in a vehicle, particularly laterally to a body of the vehicle, comprising:

a first and a second elastic support device (53, 54) which elastically support said engine-transmission assembly at opposite ends thereof, respectively, substantially along a rolling axis of inertia (Ir) thereof; and a third and a fourth elastic support device (55, 56) which elastically support said engine-transmission assembly at opposite sides thereof, respectively, substantially along a pitching axis of inertia (Ip) thereof wherein said first and second elastic support devices each further comprise a block type device and which operate together to support a major portion of the weight of said engine-transmission assembly and wherein said third and fourth elastic support devices each further comprise means for presenting a variable spring constant and/or damping coefficient according to driving conditions of the vehicle and which operate together to support rotational moment of said engine-transmission assembly around said rolling axis of inertia thereof.

2. A mounting structure for mounting an engine-transmission assembly in a vehicle according to claim 1, wherein said third and fourth elastic support devices each further comprise means for presenting a low spring constant and low damping coefficient against a load of high frequency and small amplitude applied thereto and a high spring constant and high damping coefficient against a load of low frequency and large amplitude applied thereto in running operation of the vehicle, and a low spring constant and low damping coefficient against a load of a wide range of frequency and amplitude applied thereto in idling operation of the vehicle.

3. A mounting structure for mounting an engine-transmission assembly in a vehicle according to claim 2, wherein said third and fourth elastic support devices (55, 56) each further comprise a first and a second body member (1, 2) movable relative to one another in a direction to absorb a rotational movement of said engine-transmission assembly around said rolling axis of inertia thereof; an annular segment (5) made of resilient material and coupled to said first and second body members so as to define a flexible vessel structure; partition means (2c, 2d, 2e, 14, 12, 16) incorporating a parallel arrangement of a first and a second throttle opening (10, 11) and supported by said second body member (2) so as to define a first chamber space (6) on one side of said partition means in cooperation with said flexible vessel structure; wall means (7) supported by said second body member so as to define a second chamber space (8) on the other side of said partition means opposite to said first side thereof; said third throttle opening incorporating a confinement chamber (d1) formed therein to extend along opposite outside surfaces thereof, a first hole of a lesser extent than said confinement chamber in directions parallel to said outside surfaces which communicates said confinement chamber to said first chamber space, a second hole also of a lesser extent than said confinement chamber in said direction parallel to said outside surfaces which communicates said confinement chamber to said second chamber space, and a disc-shaped throttle member (12) retained in said confinement chamber and having a lesser extent (d3) than said confinement chamber (d1) in said directions parallel to said outside surfaces and also having a lesser extent than said confinement chamber in a direction perpendicular to said outside surfaces so as to be freely movable to a certain extent in said confinement chamber in said directions perpendicular to said outside surfaces; said disc-shaped throttle member having substantially the same specific gravity as a fluid filled in said first and second chamber spaces and being formed with at least one notch (15) which overlaps both said first and second holes in said partition means so as to provide a throttled opening even when said throttle member is shifted in said confinement chamber to a first extreme end thereof toward said first chamber space or to a second extreme end thereof toward said second chamber space; the difference between the extents in said direction perpendicular to said outside surfaces of said partition means and said throttle member providing substantially unthrottled passage between said first and second chamber spaces through said first and second holes and said confinement chamber and around said throttle member when said throttle member is at a midst of said confinement chamber with respect to said directions perpendicular to said outside surfaces of said partition means; and valve means (18) for selectively substantially opening or closing said second throttle means (11) which is controllable according to operational conditions of the vehicle.

* * * * *